Figure 1:
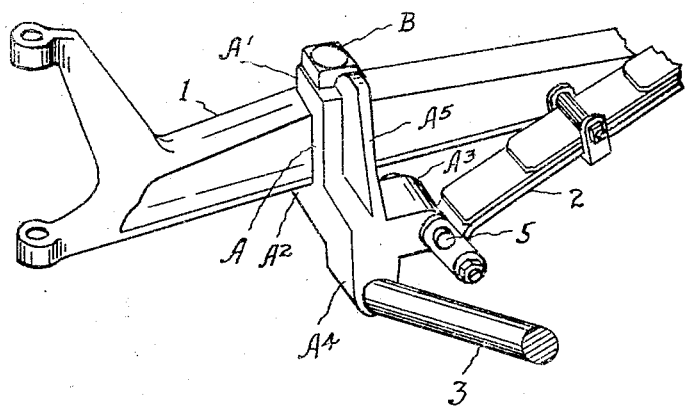

R. M. ROOF.
FRONT SPRING BAR CONNECTION DEVICE.
APPLICATION FILED JUNE 3, 1920.

1,381,433.

Patented June 14, 1921.

INVENTOR
ROBERT M. ROOF
BY Thomas L. Ryan
ATTORNEY

UNITED STATES PATENT OFFICE.

ROBERT M. ROOF, OF ANDERSON, INDIANA, ASSIGNOR TO LAUREL MOTORS CORPORATION, OF ANDERSON, INDIANA.

FRONT-SPRING-BAR CONNECTION DEVICE.

1,381,433.  Specification of Letters Patent.  Patented June 14, 1921.

Application filed June 3, 1920. Serial No. 386,386.

*To all whom it may concern:*

Be it known that I, ROBERT M. ROOF, a citizen of the United States, residing at Anderson, in the county of Madison and State of Indiana, have invented certain new and useful Improvements in Front-Spring-Bar Connection Devices, of which the following is a specification.

This invention relates to improvements in spring-bar connections for motor-cars. In construction as practised in well known motor-cars of standard type of the lighter class, a detail of well known structure, and which constitutes a connection between the front axle shaft and the front spring member of the frame, consists of a bolt and shackle-link arrangement that has secure connection with the end of the spring at a point or location above the axle shaft.

The object of this invention is to provide an improved connection device between the axle shaft and the spring member, capable of being secured to the standard axle shaft without modification of the axle shaft, and whereby the spring member, while being securely retained, is so retained at a position lowered substantially below the axle shaft.

Such a connection arrangement is desirable for the reason that by its use, the points of suspension of the springs are lowered, and the body of the car and its parts are correspondingly lowered. Such lowered status of the car body renders more safe the operation of the car at higher speed, and minimizes the stress and strain imparted to the axle shaft of the car.

The purposes of the invention are accomplished by the new construction, combination and arrangement of parts, shown in the annexed drawing, described in the following specification, and defined in the appended claims.

In the drawings, Figure 1 represents a perspective view of my invention. The several parts are identified by suitable characters of reference applied thereto.

The present invention consists of a metal block of form and construction to constitute a connection between the axle shaft 1, the end of the spring 2, and the end of one of the reach rods 3.

The aforesaid block A is made preferably of manganese bronze, or it may be made of any other metal of suitable strength; it has upper and lower horizontal ears $A^1$ and $A^2$ respectively each having a hole therethrough, and which ears are adapted to engage the top and bottom sides of the axle shaft 1.

The lower portion of the block comprises a horizontal lug $A^3$ and a vertical lug $A^4$. The block is secured to the axle shaft by a bolt B which is passed through the ears $A^1$ and $A^2$, and through a vertical bore in the standard axle shaft 1. The integrally formed vertical web $A^5$ that extends from the top of the block to the lower portion thereof imparts ample strength to the block at the same time permitting the block to be of minimum weight.

In the lug $A^4$ is provided a suitable bore in which the end of the reach rod 3 is secured. In the lug $A^3$ is provided a suitable bore in which the usual spring bolt 5 is inserted and secured, the spring 2 thus occupying the lowered position shown.

With this device installed, it is apparent that the frontal spring 2 is supported at a position, with reference to the axle shaft, substantially lowered, thus affording every advantage incident to the lowering of the center of gravity of the car structure proper. Cars equipped with this invention are capable of being operated safely at speed much greater than would be the case were the spring connected at points above the top of the axle bar. Moreover the car has improved riding qualities and there is improved manner of transmission of the strains from the springs to the axle bar.

In this specification is shown the preferred form of embodiment of my invention. I am aware that minor changes may be made in the form of the block, and in the form and arrangement of the parts thereof, without in the least departing from the nature and spirit of the invention, or the sacrificing of any of its advantages.

What I claim as my invention, and desire to secure by Letters Patent, is—

1. A spring-bar connection device, consisting of a block having upper and lower ears adapted to engage and to be secured to the top and bottom faces of the axle shaft, and a horizontal transverse lug at its lower side to be engaged by the motor-car spring, and a lug to be engaged by the motor car frame reach-rod.

2. A spring-bar connection device, consisting of a block having upper and lower perforated ears to engage the top and bottom faces of the axle shaft, and a horizontal transverse lug at its lower side to be engaged by the motor-car spring, and a lug to be engaged by the motor car frame reach rod, and a connector bolt to pass through the ears and through the axle shaft, substantially as described.

In testimony whereof I affix my signature.

ROBERT M. ROOF.